(12) United States Patent
Rajauria et al.

(10) Patent No.: US 11,244,703 B2
(45) Date of Patent: Feb. 8, 2022

(54) IN-SITU NFT PRE-TREATMENT TO ACCUMULATE OPTICALLY TRANSPARENT MATERIAL ON NFT TO IMPROVE RELIABILITY

(71) Applicant: Western Digital Technologies, Inc., San Jose, CA (US)

(72) Inventors: Sukumar Rajauria, San Jose, CA (US); Yuichi Aoki, Tokyo (JP); Yukio Kato, Kanagawa-ken (JP); Kosuke Nagase, Kanagawa-ken (JP); Kiyoshi Hashimoto, Kanagawa-ken (JP); Qing Dai, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/172,371

(22) Filed: Feb. 10, 2021

(65) Prior Publication Data

US 2021/0272595 A1    Sep. 2, 2021

Related U.S. Application Data

(62) Division of application No. 16/805,414, filed on Feb. 28, 2020, now Pat. No. 10,950,266.

(51) Int. Cl.
*G11B 5/31* (2006.01)
*G11B 5/012* (2006.01)
(Continued)

(52) U.S. Cl.
CPC .......... *G11B 5/7366* (2019.05); *G11B 5/3133* (2013.01); *G11B 5/4866* (2013.01); *G11B 2005/0021* (2013.01)

(58) Field of Classification Search
CPC ....... G11B 11/24; G11B 5/012; G11B 5/6088; G11B 11/26; G11B 2005/0021;
(Continued)

(56) References Cited

U.S. PATENT DOCUMENTS

| 1,026,202 | A | 5/1912 | Clawson |
| 5,768,056 | A | 6/1998 | Boutaghou et al. |

(Continued)

OTHER PUBLICATIONS

Xiong, Shaomin et al.; "Smear removal/mitigation by approaching head disk proximity"; https://priorart.ip.com/IPCOM/000246812, Jul. 1, 2016 (2 pages).

(Continued)

*Primary Examiner* — Nabil Z Hindi
(74) *Attorney, Agent, or Firm* — Patterson & Sheridan, LLP; Steven H. Versteeg

(57) ABSTRACT

The present disclosure relates to pretreating a magnetic recording head to increase the lifetime of the magnetic media drive. A transparent smear is purposefully formed on the magnetic recording head to ensure the magnetic recording head does not overheat and lead to a short drive lifetime. The transparent smear is formed from material found in the magnetic media. The transparent smear is formed by pretreating the magnetic recording head with the transparent material from the magnetic media. The pretreating occurs without writing any data to the magnetic media. Once the transparent smear is in place, writing may occur. The magnetic recording head can be retreated at a later time should the transparent smear degrade. Furthermore, if an optically absorbing smear develop, it can be removed and a new transparent smear may be formed.

18 Claims, 7 Drawing Sheets

(51) Int. Cl.
*G11B 5/73* (2006.01)
*G11B 5/48* (2006.01)
*G11B 5/00* (2006.01)

(58) Field of Classification Search
CPC ....... G11B 5/40; G11B 5/6082; G11B 5/3146; G11B 5/255; G11B 5/314; G11B 5/3163; G11B 5/1275; G11B 5/3106; G11B 5/84; G11B 5/3903; G11B 5/66; G11B 5/00
USPC .......................................... 360/59, 75, 328
See application file for complete search history.

(56) References Cited

U.S. PATENT DOCUMENTS

| | | | |
|---|---|---|---|
| 6,303,280 B1 | 10/2001 | Matsunaga et al. | |
| 8,760,980 B2 | 6/2014 | Zhang et al. | |
| 8,824,249 B2 * | 9/2014 | Erden | G11B 5/02 369/13.26 |
| 8,934,198 B2 | 1/2015 | Zou et al. | |
| 9,036,307 B1 | 5/2015 | Hoshiya et al. | |
| 9,251,837 B2 | 2/2016 | Zhu et al. | |
| 9,472,229 B1 * | 10/2016 | Yang | G11B 7/126 |
| 9,601,140 B1 | 3/2017 | Rajauria | |
| 9,779,771 B1 | 10/2017 | Wang et al. | |
| 9,940,953 B1 | 4/2018 | Zavaliche et al. | |
| 10,083,713 B1 | 9/2018 | Simmons et al. | |
| 10,269,382 B1 | 4/2019 | Zavaliche et al. | |
| 10,276,202 B1 | 4/2019 | Jubert et al. | |
| 10,614,850 B1 | 4/2020 | Jones et al. | |
| 2005/0282038 A1 | 12/2005 | Yamamoto et al. | |
| 2012/0105996 A1 | 5/2012 | Katine et al. | |
| 2014/0168817 A1 | 6/2014 | Choe et al. | |
| 2015/0044510 A1 | 2/2015 | Carpick et al. | |
| 2015/0124350 A1 | 5/2015 | Do et al. | |
| 2015/0262603 A1 | 9/2015 | Tonooka et al. | |
| 2016/0267935 A1 | 9/2016 | Ikeda | |
| 2017/0194368 A1 | 7/2017 | Roy et al. | |
| 2017/0221511 A1 | 8/2017 | Dai et al. | |
| 2018/0233166 A1 | 8/2018 | Brand et al. | |
| 2019/0080713 A1 | 3/2019 | Ozyilmaz et al. | |
| 2020/0010619 A1 | 1/2020 | Minami et al. | |
| 2020/0219534 A1 | 7/2020 | Jones et al. | |

OTHER PUBLICATIONS

Xiong, Shaomin, "Head-disk Interface Study for Heat Assisted Magnetic Recording (HAMR) and Plasmonic Nanolithography for Patterned Media"; UC Berkley Electronic Theses and Dissertations, https://escholarship.org/uc/item/0g8197fc, 2014 (185 pages).

Zhong, Chuan et al.; "Effective heat dissipation in an adiabatic near-field transducer for HAMR"; Optics Express, vol. 26, No. 15, Jul. 23, 2018 (13 pages).

International Search Report issued in corresponding International Patent Application No. PCT/US2020/034788, dated Jul. 29, 2020 (9 pages).

International Search Report and Written Opinion issued in corresponding International Patent Application No. PCT/US2020/035133, dated Jul. 29, 2020 (11 pages).

* cited by examiner

IN-SITU NFT PRE-TREATMENT TO ACCUMULATE OPTICALLY TRANSPARENT MATERIAL ON NFT TO IMPROVE RELIABILITY

CROSS-REFERENCE TO RELATED APPLICATIONS

This application is a divisional of co-pending U.S. patent application Ser. No. 16/805,414, filed Feb. 28, 2020, which is herein incorporated by reference.

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface of the recording medium. As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted recording technology to improve the recording density of a magnetic recording medium. In HAMR, a laser source is located next to or near the write element in order to produce heat, such as a laser source exciting a near-field transducer (NFT) to produce heat at a write location of a magnetic recording medium. The NFT temperature has a direct impact on device reliability. A high NFT temperature will lead to lower lifetime/reliability. Additionally, the HAMR interface will accumulate material on the NFT. This accumulated material is oftentimes referred to as a smear. The smear contains optically absorbing material which increases the NFT temperature.

Therefore, there is a need in the art for an improved magnetic media drive that reduces or eliminates the optically absorbing smear on the NFT.

SUMMARY OF THE DISCLOSURE

The present disclosure relates to pretreating a magnetic recording head to increase the lifetime of the magnetic media drive. An optically transparent smear is purposefully formed on the magnetic recording head to ensure the magnetic recording head does not overheat and lead to a short drive lifetime. The transparent smear is formed from material found in the magnetic media. The transparent smear is formed by pretreating the magnetic recording head with the transparent material from the magnetic media. The pretreating occurs without writing any data to the magnetic media. Once the transparent smear is in place, writing may occur. The magnetic recording head can be retreated at a later time should the transparent smear degrade. Furthermore, if an optically absorbing smear develop, it can be removed and a new transparent smear may be formed.

In one embodiment, a method comprises: applying power to a magnetic recording head at a first level, wherein the first level is less than an amount of power necessary to write data to a magnetic media, wherein the magnetic recording head is disposed over the magnetic media; and applying power to the magnetic recording head at a second level that is greater than the first level, wherein the second level is greater than the first level, and wherein the second level is sufficient to write data to the magnetic media.

In another embodiment, a method comprises: removing an optically absorbing smear from a magnetic recording head; applying a transparent smear to the magnetic recording head, wherein the applying occurs without writing data to a magnetic recording media; and writing data to the magnetic recording media.

In another embodiment, a method comprises: pretreating a magnetic recording head with a silicon based material without writing data to a magnetic media; writing data to the magnetic media using the magnetic recording head; cleaning the magnetic recording head to remove optically absorbing containing material; and retreating the magnetic recording head with the silicon based material.

In another embodiment, a magnetic media drive comprises: a control unit configured to: detect that a magnetic recording head has an absorbing smear; cause the absorbing smear to be removed; cause a non-absorbing smear to be deposited on the magnetic recording head; and resume normal write operations with the magnetic recording head.

In another embodiment, a magnetic media drive comprises: a magnetic recording head; a magnetic media; and a control unit coupled to the magnetic recording head and the magnetic media, wherein the control unit is configured to: apply power to the magnetic recording head at a first level, wherein the first level is less than an amount of power necessary to write data to the magnetic media, wherein the magnetic recording head is disposed over the magnetic media; and apply power to the magnetic recording head at a second level that is greater than the first level, wherein the second level is greater than the first level, and wherein the second level is sufficient to write data to the magnetic media.

In another embodiment, a magnetic media drive comprises: a magnetic recording head; a magnetic media; and a control unit coupled to the magnetic recording head and the magnetic media, wherein the control unit is configured to: cause an optically absorbing smear to be removed from a magnetic recording head; cause a transparent smear to be applied to the magnetic recording head, wherein the applying occurs without writing data to a magnetic recording media; and cause data to be written to the magnetic media.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to pretreating a magnetic recording head to increase the lifetime of the magnetic media drive. A transparent smear is purposefully formed on the magnetic recording head to ensure the magnetic recording head does not overheat and lead to a short drive lifetime. The transparent smear is formed from material found in the magnetic media. The transparent smear is formed by pretreating the magnetic recording head with the transparent material from the magnetic media. The pretreating occurs without writing any data to the magnetic media. Once the transparent smear is in place, writing may occur. The magnetic recording head can be retreated at a later time should the transparent smear degrade. Furthermore, if an optically absorbing smear develop, it can be removed and a new transparent smear may be formed.

Figure 1:
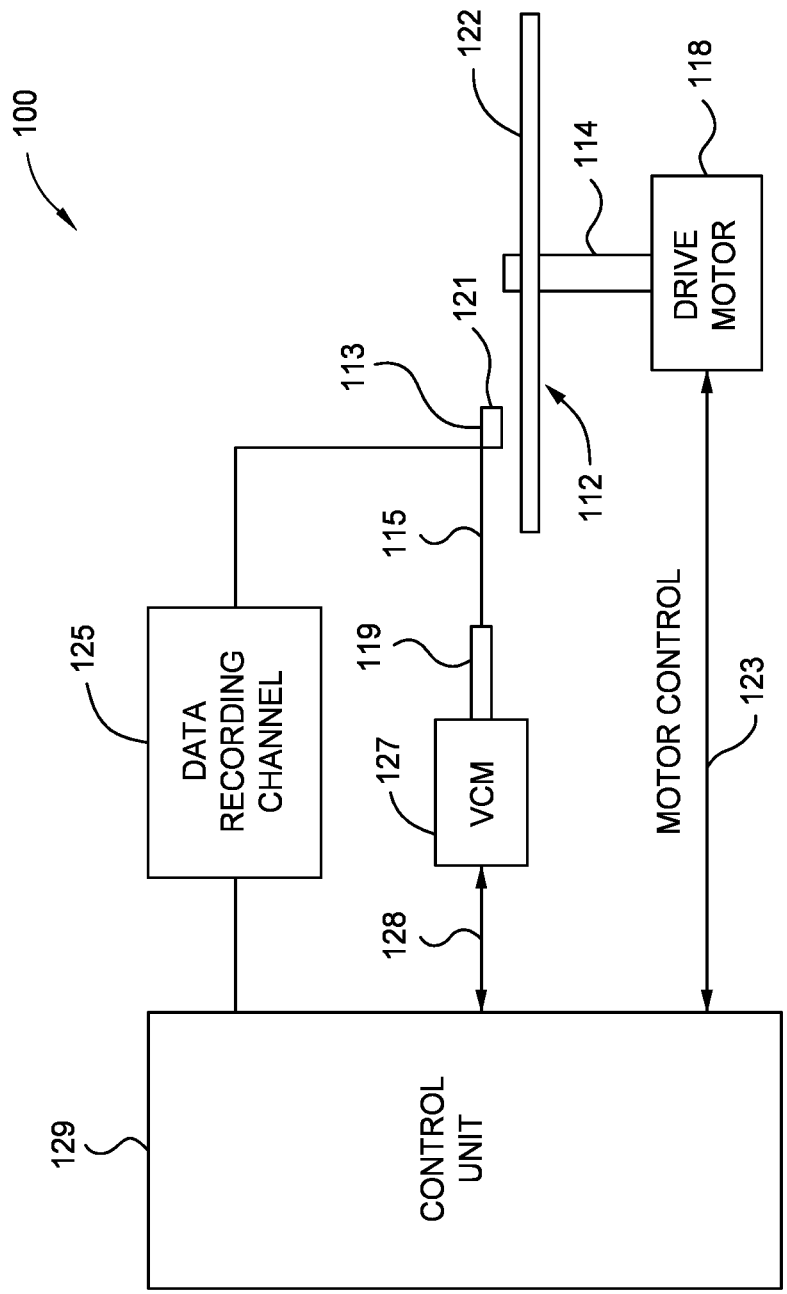
FIG. 1 is a schematic illustration of certain embodiments of a magnetic media drive including a HAMR magnetic write head.

FIG. 1 is a schematic illustration of certain embodiments of a magnetic media drive including a HAMR magnetic write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
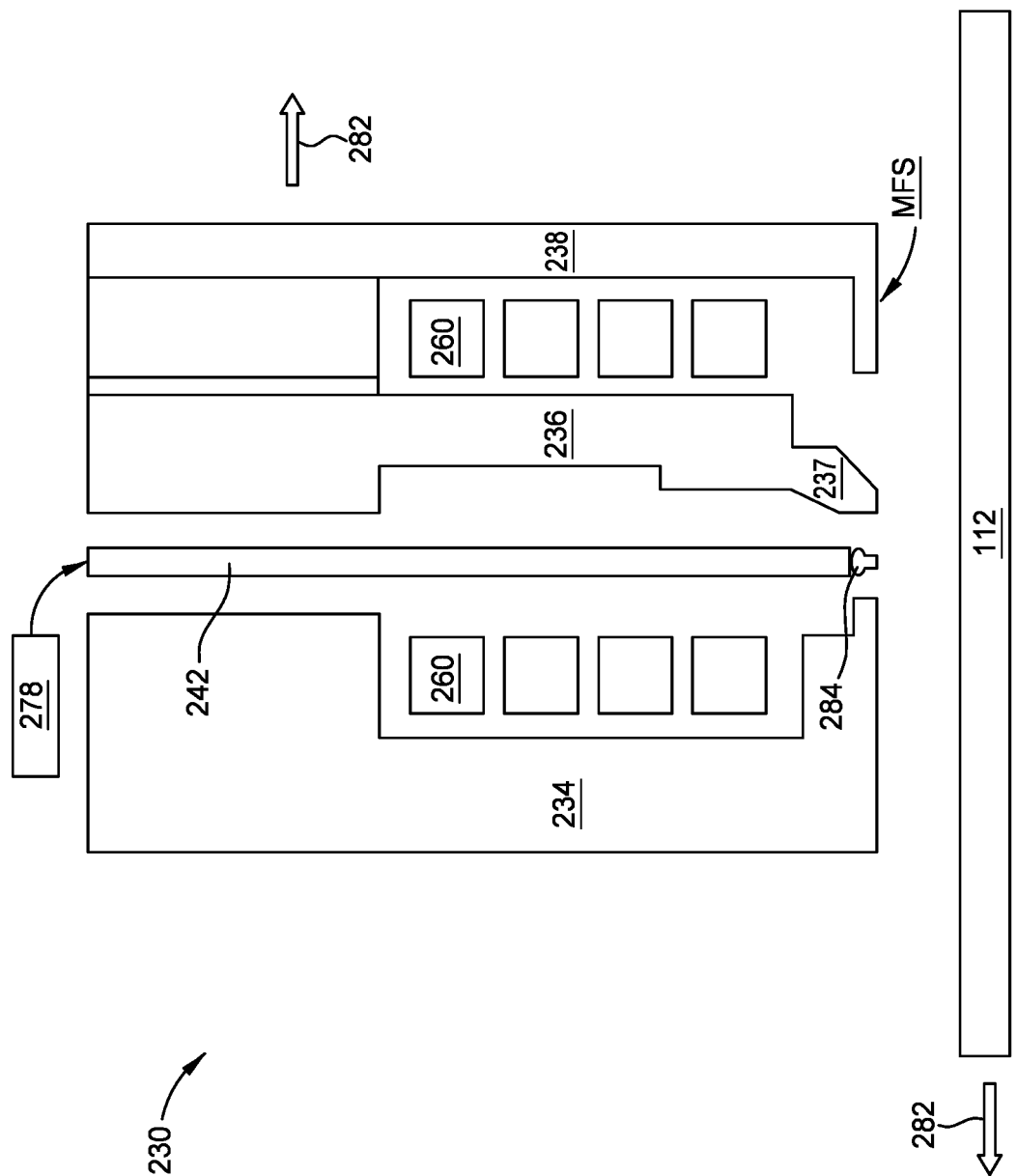
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282.

The HAMR write head 230 includes a main pole 236 disposed between a leading shield 234 and a trailing shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures.

The leading shield 234 and/or the trailing shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the focal point of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS heating a precise area of the NFT 284 which in turn heats a precise area of the magnetic disk 112. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

Figure 3A:
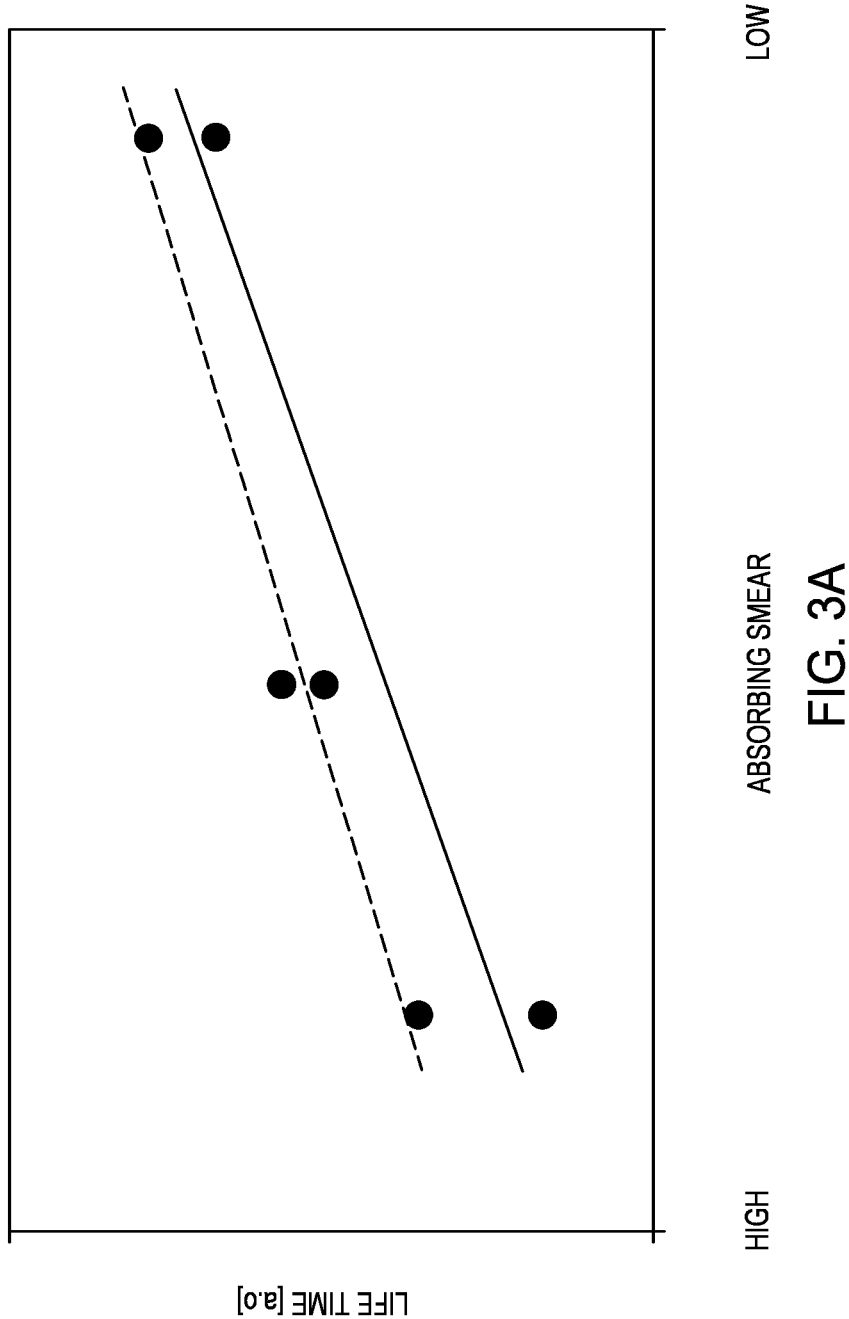
FIG. 3A is a graph illustrating the impact of optically absorbing smear on device lifetime.

FIG. 3A is a graph illustrating the impact of optically absorbing smear on device lifetime. The absorbing smear can increase the NFT temperature by more than 50. The non-absorbing smear, on the other hand, does not increase the NFT temperature. A natural thought would be to simply not form any smear on the recording head. However, in practice, simply not forming any smear is not an option. A smear will naturally form, and there is only so much smear that can actually form. In other words, a smear will form, but the smear will not have an unlimited thickness. Thus, because a smear will form, it would be beneficial to form a non-absorbing smear, but not form (or form as little as possible) an absorbing smear. Therefore, selectively forming the non-absorbing or transparent smear on the NFT is desired.

Figure 3B:
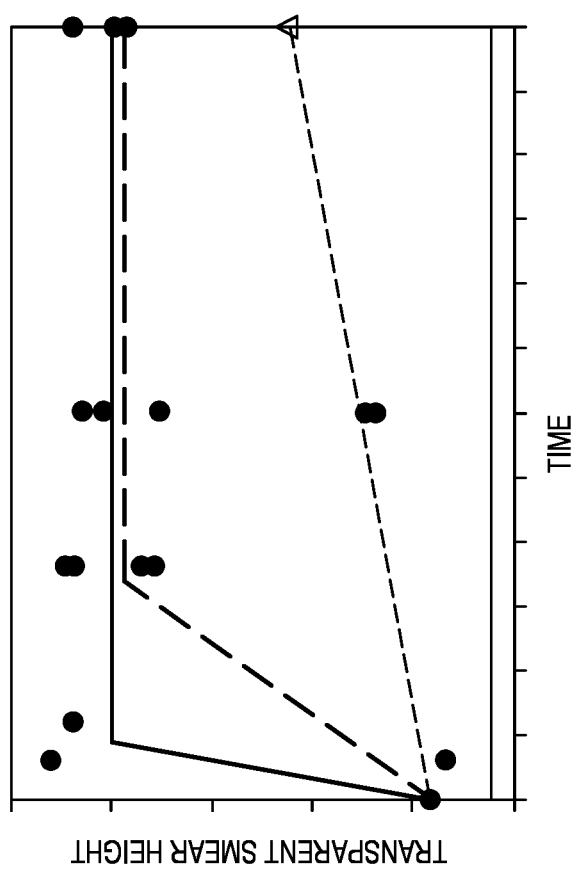
FIG. 3B is a graph illustrating the growth of transparent smear on device.

FIG. 3B is a graph illustrating the growth of transparent smear on device. As shown in FIG. 3B, the smear height is saturated by clearance. The three different lines show the speed with which the non-absorbing smear is formed.

The smear is formed from material that is present in the magnetic recording medium that deposits on the magnetic recording head during operation. Therefore, the non-absorbing or transparent material that forms the non-absorbing or transparent smear on the magnetic recording head is present in the magnetic recording medium. Additional non-absorbing or transparent material in the magnetic recording medium is beneficial in selectively forming the non-absorbing or transparent smear. Selectively doping the non-absorbing or transparent material into the magnetic recording medium is manner to provide the additional non-absorbing or transparent material to the magnetic recording medium.

Figure 4:
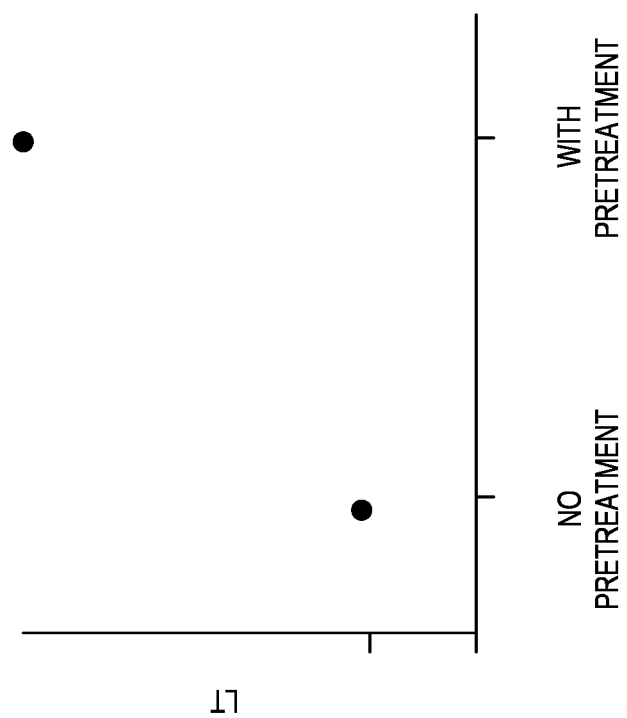
FIG. 4 is a graph illustrating the impact of pretreating the NFT according one embodiment.

Once the non-absorbing material or transparent material is in the magnetic recording medium, the material needs to be deposited on the magnetic recording head as a non-absorbing or transparent smear. FIG. 4 is a graph illustrating the impact of pretreating the NFT according one embodiment. It shows that the pretreatment will result in a longer lifetime because the pretreatment purposefully forms a non-absorbing smear on the magnetic recording head.

Figure 5A:
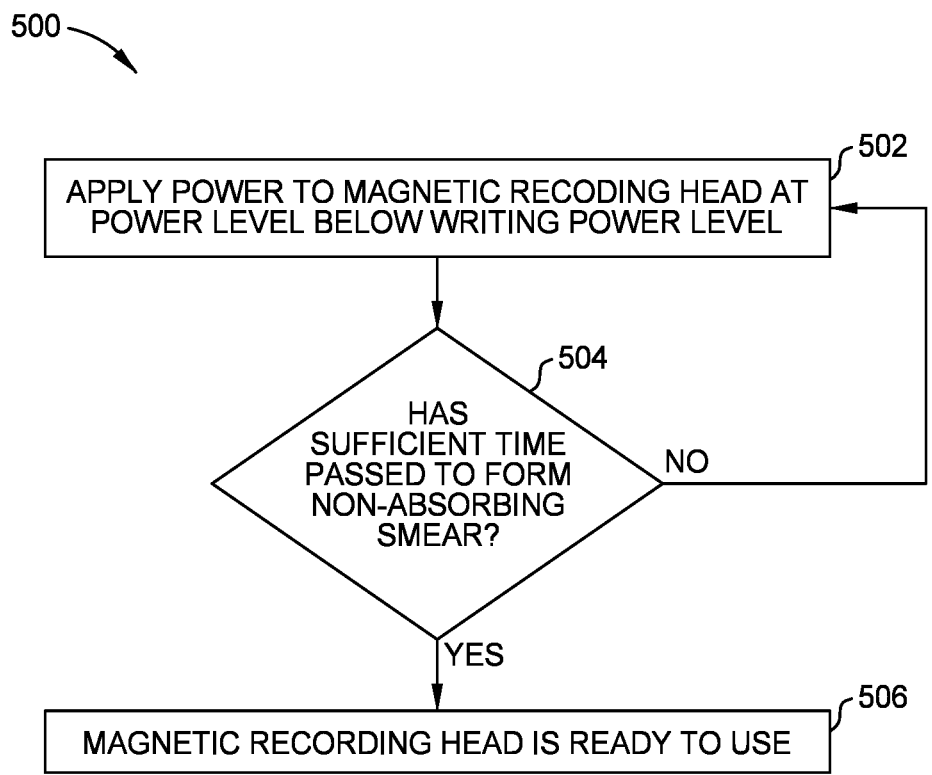
FIG. 5A is a flowchart illustrating a method of pretreating the NFT according to one embodiment.

FIG. 5A is a flowchart 500 illustrating a method of pretreating the NFT according to one embodiment. In order to pretreat the NFT, the magnetic recording medium needs to have some material therein that will be the basis for the non-absorbing or transparent smear. The material is placed in the medium during manufacturing. Suitable materials include silicon and oxides. Suitable oxides may be selected from the group consisting of silicon oxide, silicon dioxide, tantalum oxide, titanium oxide, and combinations thereof. In some embodiments, the material is transparent in a wavelength range of between about 800 nm and about 900 nm.

Once fully assembled, the magnetic recording head is moved into a position over the medium. Power will then be applied to the magnetic recording head in 502, but the power level will be below the normal operating level for writing data. For example, the power level applied to the magnetic recording head will be between 50 percent and less than 100 percent, such as 80 percent, of the normal operating power level for writing data to the medium. While the power is applied, the transparent smear will begin to form. The power will be applied for a time period of between about 2 seconds and about 15 minutes. If sufficient time has not passed to form the non-absorbing smear in 504, then the power will continue to be applied. If, however, sufficient time has passed such that the non-absorbing smear has formed, then the magnetic recording head is ready to use for writing in 506. Additionally, after a predetermined period of time, the non-absorbing smear formation can be checked. If the non-absorbing smear isn't satisfactory, the power level can be increased.

Figure 5B:
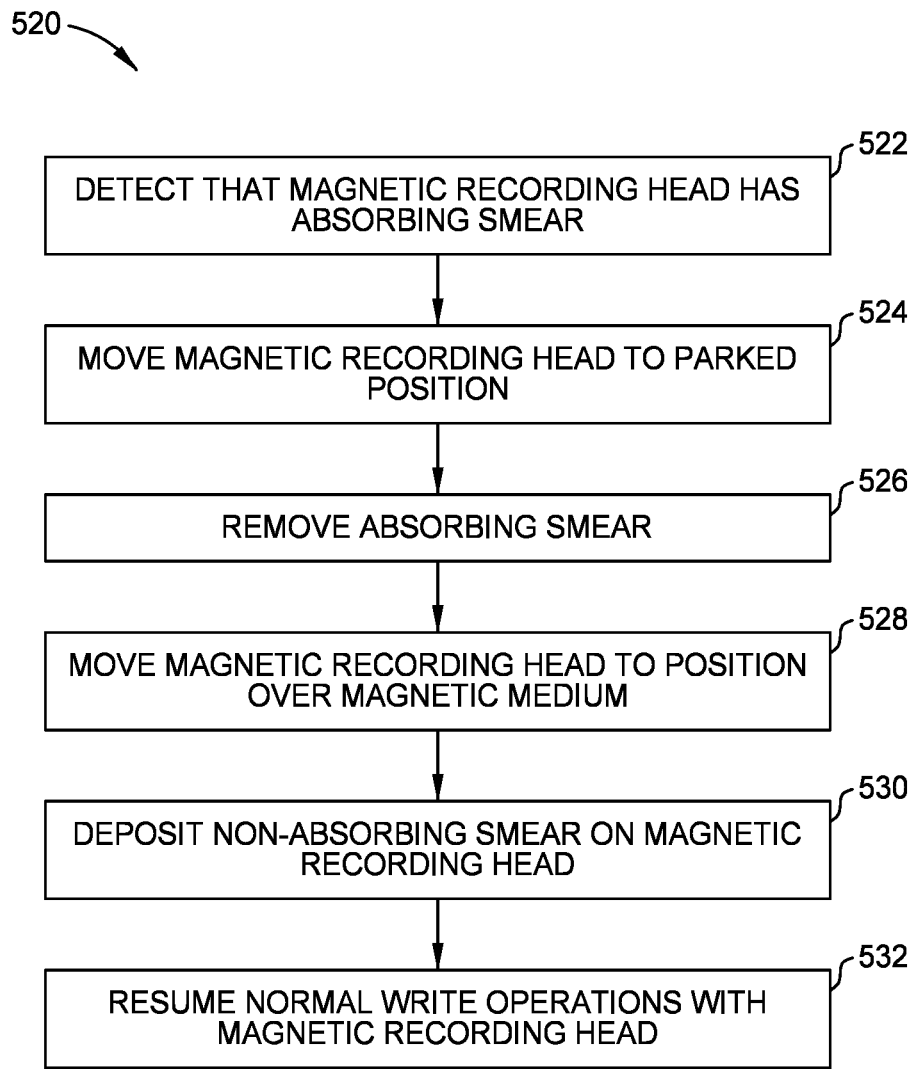
FIG. 5B is a flowchart illustrating a method of pretreating the NFT according to one embodiment.

FIG. 5B is a flowchart 520 illustrating a method of pretreating the NFT according to another embodiment. During normal operation, it is possible for the non-absorbing smear to diminish and an absorbing smear to develop. The absorbing smear can be detected in 522. In one embodiment, the absorbing smear is detected by applying an oscillating signal to a heat or light source for the NFT to dither the spacing between the NFT and the medium. Based upon a change in a contact detection signal, it can be determined that an absorbing smear has formed. In another embodiment, the NFT has a temperature sensor that indicates temperatures for the NFT during operation are higher than normal. The higher temperatures are indicative of an absorbing smear being present on the NFT.

Once the absorbing smear has been detected, the magnetic recording head can be moved to the parked position in 524 which is away from the medium and not disposed directly over the medium. The absorbing smear, and potentially any non-absorbing smear, can be removed at the parked position in 526. The magnetic recording head may then be moved back to a position over the medium in 528. The non-absorbing smear can then be reformed in 530 and normal write operations can resume in 532. While the smear is removed in the parked position, it is contemplated that the smear may be removed in when the head is disposed over the medium such that the smear materials are redeposited on the medium.

The pretreatment, or retreatment, occurs at a lower stress condition (i.e., lower power level that normal write conditions) for a longer period of time than typical for write conditions. The stress conditions occurs when the magnetic recording head is in use and more specifically, above room temperature (i.e., about 25 degrees Celsius). The magnetic recording head is not stressed when at room temperature. The stress in the magnetic recording head increases as the NFT temperature increases, and conversely the stress decreases as the NFT cools back to room temperature. The embodiments discussed herein result in the head purposely operating in a stress condition in order to form a transparent or non-absorbing smear, and the stress condition is less than the stress condition at which writing occurs. Hence, during formation of the transparent or non-absorbing smear, no writing occurs. Furthermore, during formation of the transparent or non-absorbing smear, the power level applied is below the power level applied during write operations. The power applied during write operations places the head under the maximum stress level. During operation at the lower stress level, the head is pretreated to generate the non-absorbing or transparent smear on the head by depositing the silicon or oxide materials from the medium onto the head.

In one embodiment, a method comprises: applying power to a magnetic recording head at a first level, wherein the first level is less than an amount of power necessary to write data to a magnetic media, wherein the magnetic recording head is disposed over the magnetic media; and applying power to the magnetic recording head at a second level that is greater than the first level, wherein the second level is greater than the first level, and wherein the second level is sufficient to write data to the magnetic media. The first level is greater than 50 percent and less than 100 percent of the second level. The first level is applied for a time period of between about 2 seconds to about 15 minutes. While applying power at the first level, a smear is formed on the magnetic recording head. The smear comprises a material that is transparent at a wavelength of between about 800 nm and about 900 nm. The smear comprises an oxide. The smear comprises a silicon containing material. The magnetic recording head is a heat assisted magnetic recording (HAMR) head.

In another embodiment, a method comprises: removing an optically absorbing smear from a magnetic recording head; applying a transparent smear to the magnetic recording head, wherein the applying occurs without writing data to a magnetic recording media; and writing data to the magnetic recording media. The applying occurs while the magnetic recording head is disposed over the magnetic recording media. The removing occurs while the magnetic recording head is not disposed over the magnetic recording media. The applying comprises depositing material from the magnetic recording media on the magnetic recording head. The material is transparent at a wavelength of between about 800 nm and about 900 nm. The material comprises an oxide. The material comprises a silicon containing material. The applying occurs at a first temperature, wherein the writing occurs at a second temperature, and wherein the second temperature is greater than the first temperature.

In another embodiment, a method comprises: pretreating a magnetic recording head with a silicon based material without writing data to a magnetic media; writing data to the magnetic media using the magnetic recording head; cleaning the magnetic recording head to remove optically absorbing material; and retreating the magnetic recording head with the silicon based material. The pretreating, writing, and retreating all occur with the magnetic recording head disposed over the magnetic media. The magnetic recording head is a heat assisted magnetic recording (HAMR) head. The pretreating and retreating comprises depositing silicon material on the magnetic recording head, wherein the silicon material originates from the magnetic media.

In another embodiment, a magnetic media drive comprises: a control unit configured to: detect that a magnetic recording head has an absorbing smear; cause the absorbing smear to be removed; cause a non-absorbing smear to be deposited on the magnetic recording head; and resume normal write operations with the magnetic recording head. The control unit is further configured to move the magnetic recording head into a parked position, wherein the moving occurs after detecting that the magnetic recording head has an absorbing smear and prior to causing the absorbing smear to be removed. The control unit is further configured to move the magnetic recording head into a position over a magnetic recording medium, wherein the moving occurs after causing the absorbing smear to be removed and prior to causing the non-absorbing smear to be deposited.

In another embodiment, a magnetic media drive comprises: a magnetic recording head; a magnetic media; and a control unit coupled to the magnetic recording head and the magnetic media, wherein the control unit is configured to: apply power to the magnetic recording head at a first level, wherein the first level is less than an amount of power necessary to write data to the magnetic media, wherein the magnetic recording head is disposed over the magnetic media; and apply power to the magnetic recording head at a second level that is greater than the first level, wherein the second level is greater than the first level, and wherein the second level is sufficient to write data to the magnetic media. The first level is greater than 50 percent and less than 100 percent of the second level, and wherein the first level is applied for a time period of between about 2 seconds to about 15 minutes. The control unit is further configured to cause a smear to be formed on the magnetic recording head. The smear comprises a material that is transparent at a wavelength of between about 800 nm and about 900 nm and wherein the smear comprises an oxide.

In another embodiment, a magnetic media drive comprises: a magnetic recording head; a magnetic media; and a control unit coupled to the magnetic recording head and the magnetic media, wherein the control unit is configured to: cause an optically absorbing smear to be removed from a magnetic recording head; cause a transparent smear to be applied to the magnetic recording head, wherein the applying occurs without writing data to a magnetic recording media; and cause data to be written to the magnetic media. The control unit is further configured to cause the transparent smear to be applied while the magnetic recording head is disposed over the magnetic media. The control unit is further configured to cause the optically absorbing smear to be removed while the magnetic recording head is not disposed over the magnetic media. The optically transparent smear contains material from the magnetic media. The material comprises an oxide. The material comprises a silicon containing material By pretreating the NFT of the magnetic recording head, a transparent smear may be formed on the magnetic recording head and thus increase the lifetime of the magnetic media drive.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
applying power to a magnetic recording head at a first level, wherein the first level is less than an amount of power necessary to write data to a magnetic media, and wherein the magnetic recording head is disposed over the magnetic media; and
applying power to the magnetic recording head at a second level that is greater than the first level, wherein the first level is greater than 50 percent and less than 100 percent of the second level, and wherein the second level is sufficient to write data to the magnetic media.

2. A method, comprising:
applying power to a magnetic recording head at a first level, wherein the first level is less than an amount of power necessary to write data to a magnetic media, wherein the first level is applied for a time period of between about 2 seconds to about 15 minutes, and wherein the magnetic recording head is disposed over the magnetic media; and
applying power to the magnetic recording head at a second level that is greater than the first level, wherein the second level is greater than the first level, and wherein the second level is sufficient to write data to the magnetic media.

3. A method, comprising:
applying power to a magnetic recording head at a first level, wherein while applying power at the first level, a smear is formed on the magnetic recording head, wherein the first level is less than an amount of power necessary to write data to a magnetic media, and wherein the magnetic recording head is disposed over the magnetic media; and
applying power to the magnetic recording head at a second level that is greater than the first level, wherein the second level is greater than the first level, and wherein the second level is sufficient to write data to the magnetic media.

4. The method of claim 3, wherein the smear comprises a material that is transparent at a wavelength of between about 800 nm and about 900 nm.

5. The method of claim 3, wherein the smear comprises an oxide.

6. The method of claim 3, wherein the smear comprises a silicon containing material.

7. The method of claim 3, further comprising:
removing an optically absorbing smear from the magnetic recording head;
applying a transparent smear to the magnetic recording head, wherein the applying occurs at a first temperature without writing data to the magnetic media; and
writing data to the magnetic recording media, wherein the writing occurs at a second temperature, the second temperature being greater than the first temperature.

8. The method of claim 7, wherein the applying occurs while the magnetic recording head is disposed over the magnetic recording media.

9. The method of claim 8, wherein the removing occurs while the magnetic recording head is not disposed over the magnetic recording media.

10. The method of claim 7, wherein the applying comprises depositing material from the magnetic recording media on the magnetic recording head.

11. The method of claim 3, wherein the magnetic recording head is a heat assisted magnetic recording (HAMR) head.

12. The method of claim 3, further comprising:
pretreating the magnetic recording head with a silicon based material without writing data to a magnetic media;
writing data to the magnetic media using the magnetic recording head;
cleaning the magnetic recording head to remove optically absorbing containing material; and
retreating the magnetic recording head with the silicon based material.

13. The method of claim 12, wherein the pretreating, writing, and retreating all occur with the magnetic recording head disposed over the magnetic media.

14. The method of claim 12, wherein the magnetic recording head is a heat assisted magnetic recording (HAMR) head.

15. The method of claim 12, wherein the pretreating and retreating comprises depositing silicon material on the magnetic recording head, wherein the silicon material originates from the magnetic media.

16. A magnetic media drive, comprising:
a magnetic recording head;
a magnetic media; and
a control unit coupled to the magnetic recording head and the magnetic media, wherein the control unit is configured to:
apply power to the magnetic recording head at a first level, wherein the first level is less than an amount of power necessary to write data to the magnetic media, wherein the first level is greater than 50 percent and less than 100 percent of a second level, and wherein the first level is applied for a time period of between about 2 seconds to about 15 minutes, and wherein the magnetic recording head is disposed over the magnetic media; and
apply power to the magnetic recording head at the second level that is greater than the first level, and wherein the second level is sufficient to write data to the magnetic media.

17. A magnetic media drive, comprising:
a magnetic recording head;
a magnetic media; and
a control unit coupled to the magnetic recording head and the magnetic media, wherein the control unit is configured to:
apply power to the magnetic recording head at a first level, wherein the first level is less than an amount of power necessary to write data to the magnetic media, and wherein the magnetic recording head is disposed over the magnetic media;
apply power to the magnetic recording head at a second level that is greater than the first level, wherein the second level is greater than the first level, and wherein the second level is sufficient to write data to the magnetic media; and
cause a smear to be formed on the magnetic recording head.

18. The magnetic media drive of claim 17, wherein the smear comprises a material that is transparent at a wavelength of between about 800 nm and about 900 nm and wherein the smear comprises an oxide.

\* \* \* \* \*